United States Patent
Factor et al.

(10) Patent No.: US 11,681,667 B2
(45) Date of Patent: Jun. 20, 2023

(54) PERSISTING DISTRIBUTED DATA SETS INTO EVENTUALLY CONSISTENT STORAGE SYSTEMS

(71) Applicant: International Business Machines Corporation, Armonk, NY (US)

(72) Inventors: Michael Factor, Haifa (IL); Elliot K Kolodner, Haifa (IL); Gil Vernik, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 15/663,754

(22) Filed: Jul. 30, 2017

(65) Prior Publication Data
US 2019/0034221 A1    Jan. 31, 2019

(51) Int. Cl.
*G06F 16/18*     (2019.01)
*G06F 9/46*      (2006.01)

(52) U.S. Cl.
CPC .......... *G06F 16/1865* (2019.01); *G06F 9/466* (2013.01)

(58) Field of Classification Search
CPC ...... G06F 9/465; G06F 9/50; G06F 2209/505; G06F 9/466; G06F 16/1865
See application file for complete search history.

(56) References Cited

U.S. PATENT DOCUMENTS

| | | | |
|---|---|---|---|
| 9,363,322 B1 | 6/2016 | Anton et al. | |
| 2011/0041006 A1* | 2/2011 | Fowler | G06F 9/5072 714/10 |
| 2011/0102156 A1* | 5/2011 | Gravelle | H04Q 9/00 340/10.6 |
| 2012/0117423 A1* | 5/2012 | Andrade | G06F 11/1438 714/16 |
| 2012/0191734 A1* | 7/2012 | Arditi | G06F 16/24556 707/755 |
| 2013/0110961 A1 | 5/2013 | Jadhav | |
| 2013/0166855 A1* | 6/2013 | Batwara | G06F 3/0608 711/154 |
| 2014/0279903 A1* | 9/2014 | Hsiao | G06F 16/2379 707/638 |
| 2014/0280142 A1 | 9/2014 | Wasson et al. | |
| 2017/0006135 A1 | 1/2017 | Siebel et al. | |

(Continued)

FOREIGN PATENT DOCUMENTS

WO    2016178951    11/2016

OTHER PUBLICATIONS

Li et al., "Tachyon: Reliable, Memory Speed Storage for Cluster Computing Frameworks", SOCC '14 Proceedings of the ACM Symposium on Cloud Computing, Nov. 2014, pp. 1-15.

*Primary Examiner* — Amresh Singh
*Assistant Examiner* — Fatima P Mina
(74) *Attorney, Agent, or Firm* — Gregory J Kirsch

(57) ABSTRACT

Embodiments of the present systems and methods may provide the capability ensure that data is persisted and accessed correctly without depending on eventually consistent list operations on the object store. For example, in an embodiment, a computer-implemented method for data distribution may comprise attempting to persist a plurality of data parts from a plurality of processing tasks, generating a manifest including information indicating those attempts to persist data parts that have succeeded, and persisting the manifest with the data parts that have been successfully persisted.

20 Claims, 5 Drawing Sheets

(56) References Cited

U.S. PATENT DOCUMENTS

2017/0011085 A1\* 1/2017 Douros ................... G06F 16/27
2018/0011886 A1\* 1/2018 LeFevre .............. G06F 16/2379
2018/0011895 A1\* 1/2018 Johnson .............. G06F 16/2365

\* cited by examiner

PERSISTING DISTRIBUTED DATA SETS INTO EVENTUALLY CONSISTENT STORAGE SYSTEMS

BACKGROUND

The present invention relates to techniques for ensuring that data is persisted and accessed correctly without depending on eventually consistent list operations on the object store.

Big Data analytics systems need to read, analyze, and write large amounts of data. In many cases the output of an analytic job is a distributed data set partitioned across many files/objects and written by many tasks. Persisting an entire distributed data set to an object store is a challenging operation that needs to be carefully performed. For example, a task may fail to complete, yet persist partial data and the system may run a replacement task in its place. Also some systems execute in speculate mode, where multiple tasks try to persist the same data. The main challenge is how to decide if an entire job is successful or if it should be declared failed. A conventional approach is to use temporary files for persisting the data from the tasks. At a commit phase, temporary files are renamed to their final names and then if all the tasks committed successfully, an entire job declared to be successful. Other approaches adapted to object stores, such as the Stocator project, take an alternative approach that avoids temporary files/objects, but still need to determine which files/objects belong to the final data set. Further, such solutions as AMAZON® EMFRS, NETFLIX® S3MPER, and S3GUARD (APACHE HADOOP™) require an external data store that is strongly consistent, which increases system complexity and cost.

Typically, object list operations are integral parts of the conventional approaches mentioned above. Some systems list objects to identify successfully written parts and some use lists to find temporary data that should be renamed to the final names. However, an issue arises here in that list operations are eventually consistent in object stores. Eventual consistency is a form of weak consistency in which all copies of a data item are guaranteed to eventually be consistent, but there is no guarantee as to the length of the delay before all copies have been updated. For example, even if 'PUT dataroot/foo' completed successfully, listing 'dataroot/*' at any particular time may display an old 'foo' (or even not list Too' at all if it did not previously exist). This is because, the PUT operation could complete successfully before the data structure on which the listing depends is updated. This may have a negative impact on persisting the results of an analytic job in the object store. In particular, Big Data analytic jobs perform list operations during the write and commit stages for their underlying tasks. Since list operations are eventually consistent, the listings may provide inaccurate results, thus affecting the overall correctness of the analytic job.

Even if a distributed set is persisted successfully, there still may be an issue due to the eventual consistency of the list operations. For example, consider the case where Apache Spark creates a Resilient Distributed Dataset (RDD) distributed across 10 tasks. This RDD is to be persisted as a data set "foo". Since the RDD is distributed across 10 tasks, each task will only persist its own data. Thus, when the entire job has completed successfully, the object store will contain "foo/part-1, foo/part-2, . . . , foo/part-10". Assume another analytic job now reads "foo" back soon after it was written and counts the number of lines. However, due to the eventual consistency of the list operation, when Spark performs the list operation on "foo/*" to identify all the parts, the listing may miss some parts, for example, the listing may not include "foo/part-4", even though "foo/part-4" was stored correctly.

Accordingly, a need arises for techniques by which distributed data sets may be persisted without being affecting by the eventual consistency of the object stores. This will ensure that data is persisted and accessed correctly without depending on eventually consistent list operations on the object store.

SUMMARY

Embodiments of the present systems and methods may provide the capability ensure that data is persisted and accessed correctly without depending on eventually consistent list operations on the object store.

For example, in an embodiment, a computer-implemented method for data distribution may comprise attempting to persist a plurality of data parts from a plurality of processing tasks, generating a manifest including information indicating those attempts to persist data parts that have succeeded, and persisting the manifest with the data parts that have been successfully persisted.

In embodiments, the name of each data part may include a unique identifier of the data part and of the attempt to persist the data part. The manifest may include, for each data part that has been successfully persisted, a unique identifier of the data part and of the attempt to persist the data part. The method may further comprise reading the manifest to obtain the unique identifier of each data part and of the attempt to persist the data part that has been successfully persisted and based on the unique identifier, reading the data parts that have been successfully persisted. The method may further comprise reading the manifest to obtain information identifying the data parts that have been successfully persisted and based on the information identifying the data parts that have been successfully persisted, reading the data parts that have been successfully persisted. The manifest may be persisted to a same object store location as the data parts.

In an embodiment, a system for data traffic distribution may comprise a processor, memory accessible by the processor, and computer program instructions stored in the memory and executable by the processor to perform attempting to persist a plurality of data parts from a plurality of processing tasks, generating a manifest including information indicating those attempts to persist data parts that have succeeded, and persisting the manifest with the data parts that have been successfully persisted.

In an embodiment, a computer program product for data traffic distribution may comprise a non-transitory computer readable storage having program instructions embodied therewith, the program instructions executable by a computer, to cause the computer to perform a method comprising attempting to persist a plurality of data parts from a plurality of processing tasks, generating a manifest including information indicating those attempts to persist data parts that have succeeded, and persisting the manifest with the data parts that have been successfully persisted.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and techniques may provide the capability to persist distributed data sets without being affecting by the eventual consistency of the object stores. This will ensure that data is persisted and accessed correctly without depending on eventually consistent list operations on the object store. Embodiments of the present systems and techniques do not require an external storage system to maintain object metadata with strong consistency, which reduces system complexity and costs and provides better atomicity for operations. In embodiments, the semantics of Big Data analytics may be leveraged and mechanisms available in the object store may be used to manage or mask eventual consistency. The commit phase of the analytic job may pick the correct data parts (objects) composing the output without performing list operations that may return wrong parts. Further, embodiments may avoid reading partial results due to eventual consistency.

In embodiments, there may be at least one component in the analytic system that is aware if the entire write job completed successfully and which tasks failed or succeeded. For example, many distributed computing systems, such as APACHE SPARK™ or APACHE HADOOP™ may contain master or driver nodes that contain this information.

Figure 1:
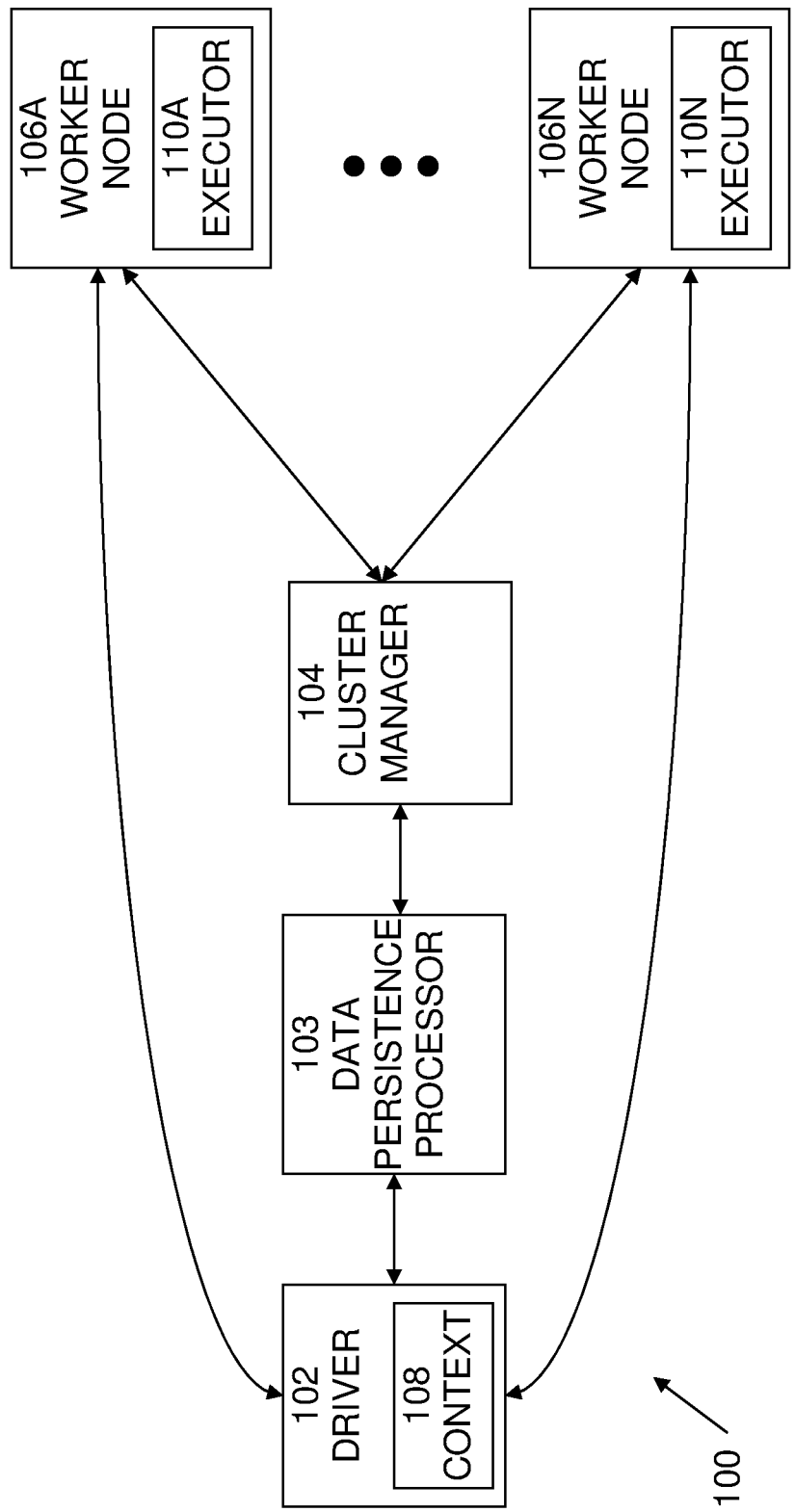
FIG. 1 illustrates an exemplary distributed computing environment in which described embodiments may be implemented.

An exemplary distributed computing environment 100, such as the APACHE SPARK™ architecture, in which embodiments of the described techniques may be implemented, is shown in FIG. 1. It is to be noted that the description of the APACHE SPARK™ architecture is merely an example. In embodiments, the techniques described herein may be applicable to any other distributed computing environment or system that may be utilized to provide an analytic framework, including, but not limited to APACHE SAMZA™, APACHE SPARK™, APACHE STORM™, APACHE FLINK™, APACHE HADOOP™, etc. In this example, distributed computing environment 100 may include one or more driver processes 102, data persistence processor 103, one or more cluster managers 104, and a plurality of worker nodes 106A-N. Driver 102 may include one or more processes running the main function of the application and may create one or more application context objects 108. Data persistence processor 103 may manage the commit phase of the processing, as described below. Each cluster manager 104 may include one or more services for acquiring resources on one or more clusters, groups, or sets of worker nodes 106A-N. Each worker node 106A-N may include functionality to run application code in the cluster. Applications in distributed computing environment 100 may run as independent sets of processes on a cluster, coordinated by context object 108 in driver 102. Driver 102 (or master task, etc.), as coordinated by context object 108, may communicate with and utilize one or more cluster managers 104. Driver/master, etc. 102 may communicate with cluster manager 104 to set up executors 110A-N on worker nodes 106A-N, but thereafter the communication between the driver and its executors is direct. Driver/master, etc. 102 may maintain a list of all successfully completed task executions and their unique IDs. Context object 108 may, for example, allow driver/master, etc. 102 to access the cluster through a resource manager (not shown). The resource manager may, for example, be a cluster manager 104, such as HADOOP YARN™ or the SPARK™ cluster manager. Typically, configuration parameters are defined and driver/master, etc. 102 will pass these configuration parameters to context object 108 so that driver/master, etc. 102 knows how to access the cluster. Some of these parameters may define properties of driver/master, etc. 102 and some may be used to allocate resources on the cluster. For example, the number, memory size and cores used by the executors 110A-N running on the worker nodes 106A-N may be passed. Once driver/master, etc. 102 is associated with context object 108, driver/master, etc. 102 knows what resource manager to use and can ask it for resources on the cluster. In embodiments, the resource manager and one or more node manager in worker nodes 106A-N will work to allocate a container for the executors 110A-N. If the resources are available on the cluster, executors 110A-N will allocate memory and cores based the configuration parameters. In embodiments, cluster manager 104, driver/master, etc. 102, and processes in worker nodes 106A-N will be used to allocate the executors 110A-N. Each driver/master, etc. 102 may have its own executors 110A-N on the cluster that remain running as long as the executors 110A-N has a context object 108. The executors 110A-N may run user code, run computations and can cache data for applications.

Figure 2:
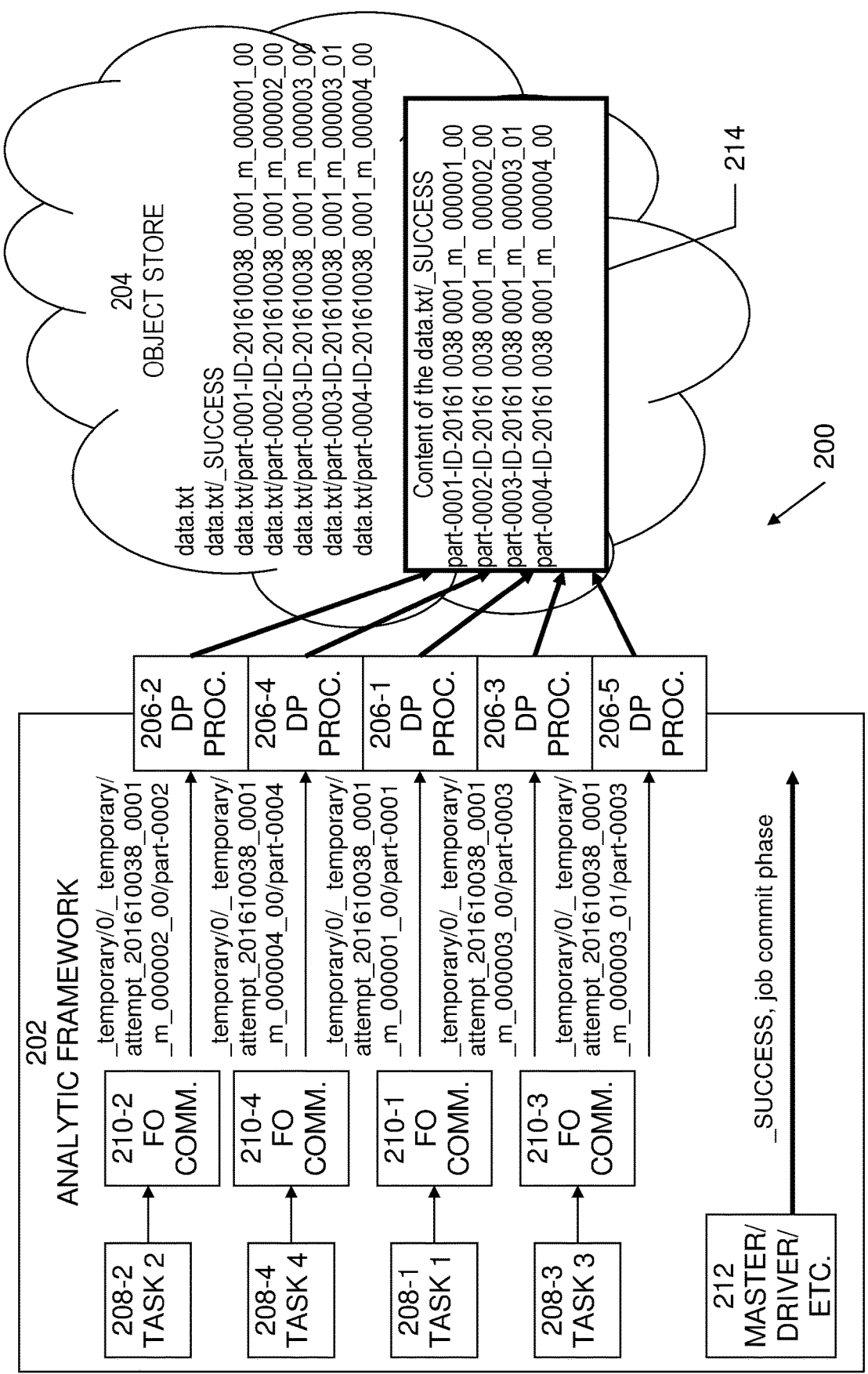
FIG. 2 illustrates an exemplary distributed computing environment in which described embodiments may be implemented.

An exemplary embodiment of a distributed computing environment 200 is shown in FIG. 2. This example may include an analytic framework 202, an object storage system 204, and a plurality of data persistence processors 206-1 to 206-5. Analytic framework 202 may be implemented in a distributed computing system, such as APACHE SAMZA™, APACHE SPARK™, APACHE STORM™, APACHE FLINK™, APACHE HADOOP™, etc. Object storage system 204 may be a computer data storage system that stores, maintains, and retrieves data. In some embodiments, object storage system 204 may manage data as objects, including the data itself, a variable amount of metadata, and a globally unique identifier Object storage system 204 may manage storage at a higher level than file systems or block storage. Typically object storage systems may be implemented on top of a cluster of servers, where each server has its own file system, and the object storage provides the distribution layer implementing object storage over these servers. Data persistence processors 206-1 to 206-5 may provide management of the commit phase of analytic processing jobs so as to manage or mask the effects of eventual consistency.

Analytic framework 202 may include a plurality of tasks 208-1, 208-2, 208-3, 208-4, which may perform processing in the framework. In a typical analytic framework 202, there may be multiple output committers 210-1 to 210-4 and multiple data persistence processors 206-1 to 206-5 in a distributed system. Accordingly, in embodiments, each task, pair of tasks, or group of tasks may have its own output committer and data persistency processor. Likewise, each task or small group of tasks may share an output committer 210-1 to 210-4 and a data persistence processor 206-1 to 206-5. Embodiments may include any and all such arrangements.

As tasks 208-1, 208-2, 208-3, 208-4 generate data to be stored, that data may be output to file output committers 210-1 to 210-4, which may handle data storage transactions in the framework. File output committers 210-1 to 210-4 may generate specific data parts, such as files or parts of files, and may generate identifications of those data parts, such as file names for the files. The generated data portions or files may be output by file output commit committers 210-1 to 210-4 to data persistence processors 206-1 to 206-5, which may manage the commit phase of the processing. In this example, only one task is shown for each output committer, while in many embodiments, each task, pair of tasks, or group of tasks may have its own output committer 210-1 to 210-4 and data persistence processor 206-1 to 206-5. A component such as master 212, or a driver component, etc., may maintain a list of all successfully completed task executions and their unique IDs.

Figure 3:
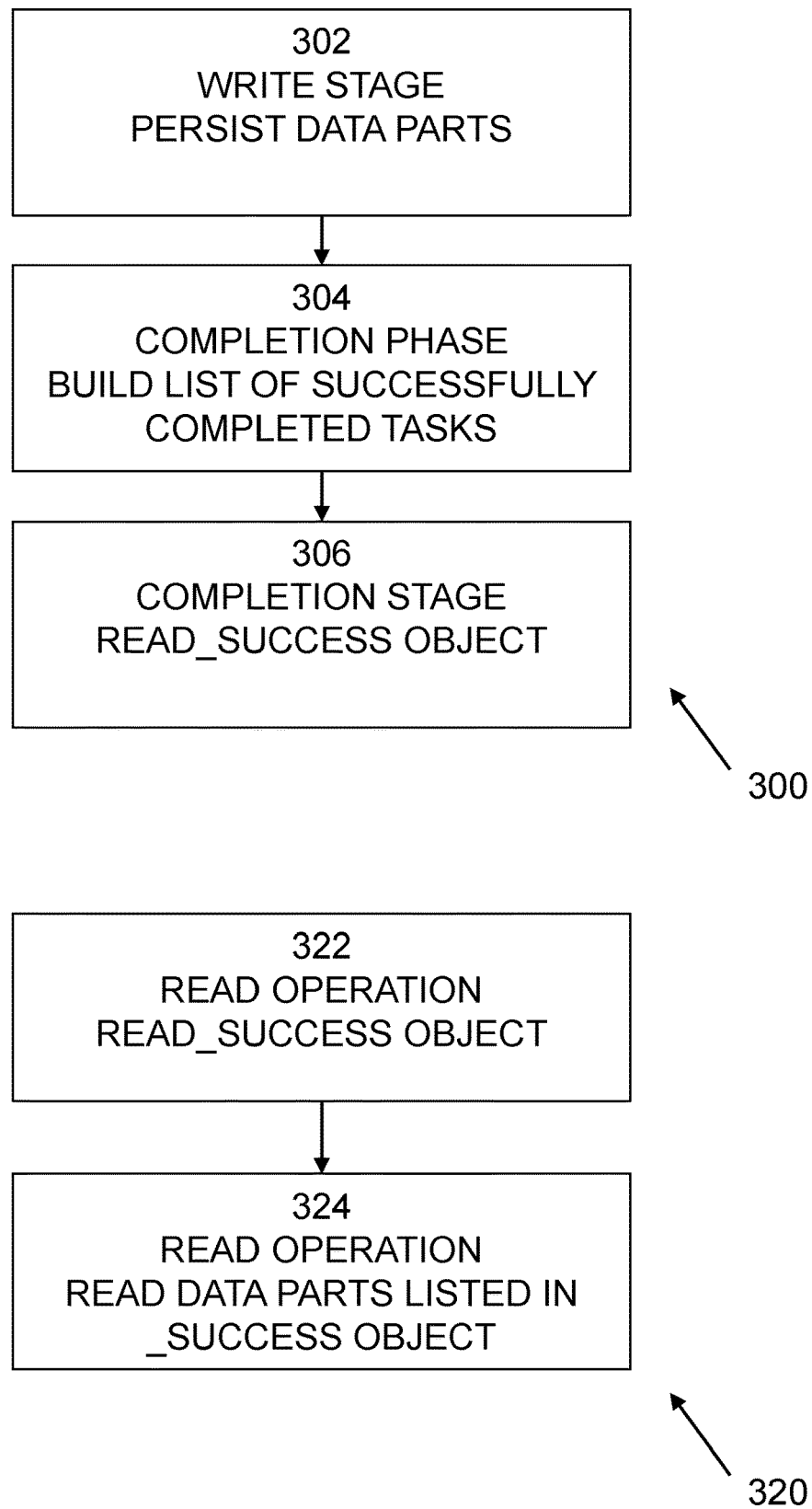
FIG. 3 is an exemplary flow diagram of processes of persisting and reading back a data set.
Figure 4:
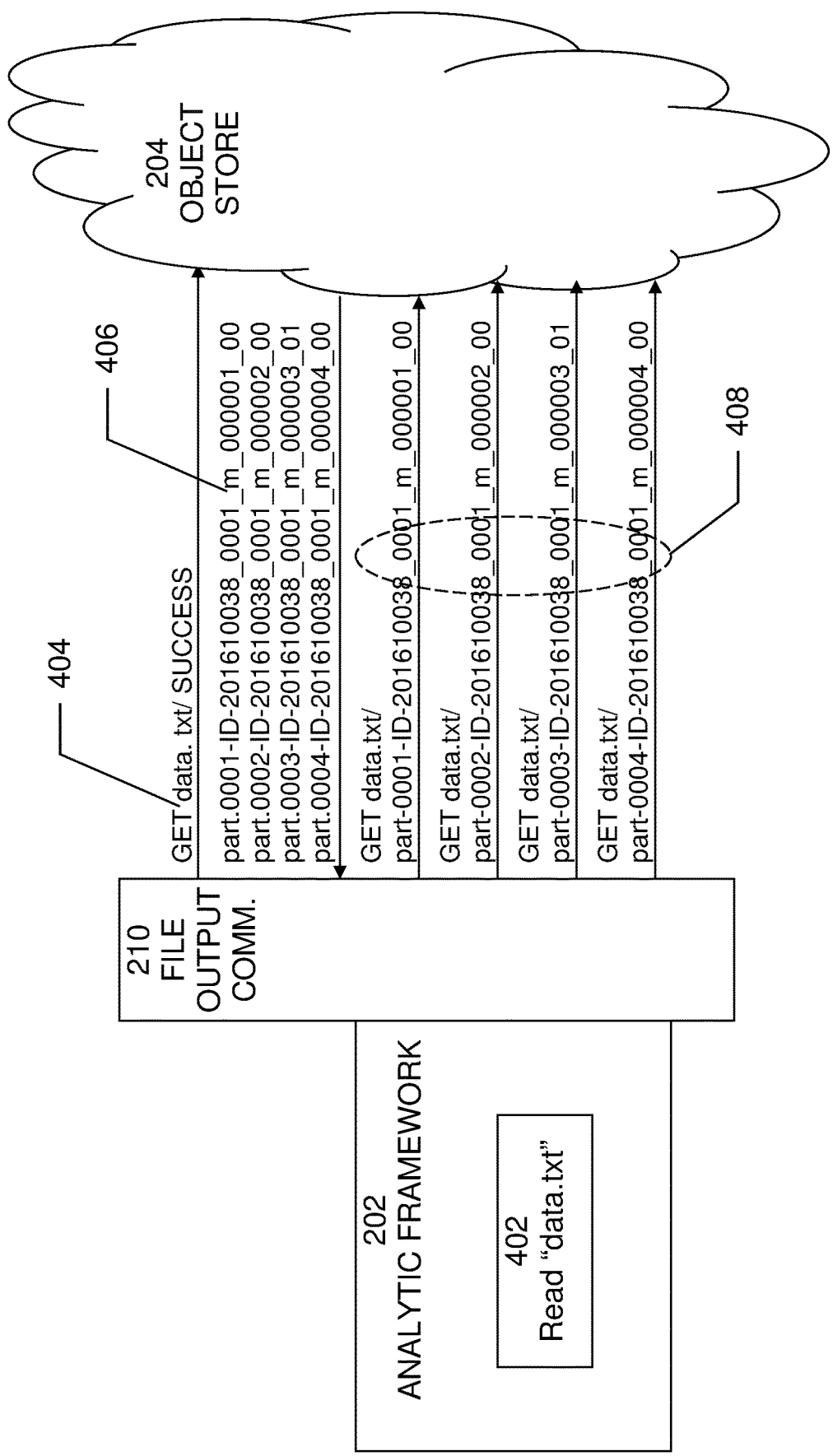
FIG. 4 illustrates an exemplary distributed computing environment in which described embodiments may be implemented.

Exemplary processes of persisting 300 and reading back 320 a data set is shown in FIG. 3. It is best viewed in conjunction with FIGS. 2 and 4. In this example, it is assumed that a data set D is distributed across "n" tasks $\{t\_1, \ldots, t\_n\}$, where in this example, n=4. Assume that for each $1<=i<=n$ the task $\{t\_i\}$ produces the data subset $\{d\_i\}$ of D. Process 300 may be used to ensure that persisting entire data set D in the object store 204 will not be affected by eventual consistency.

Process 300 begins with 302, in which a write stage of the process may be performed. As this is a distributed system, the write stage of the process may be performed independently by each task without coordination with other tasks. Each task may attempt to persist one or more data parts, which may be identified using a unique identifier of the data part and of the attempt to persist the data part. In particular, each part $\{d\_i\}$ that is persisted by a task $\{t\_i\}$ may be persisted under a name that includes a unique identifier of each task and of the execution of the task/attempt to persist the data part. For example, a data part may be identified as $d\_i\_\{task\_i\_id\}$, where task_i_id may be a unique identifier of task t_i and of the execution of task t_i. In FIG. 2, for example, a data part from task 2 208-2 may be identified as "_temporary/0/_temporary/attempt_201610038_0001_m_000002_00/part-0002," while a data part from task 3 208-4 may be identified as "_temporary/0/_temporary/attempt_201610038_0001_m_000004_00/part-0004."

The data parts are communicated to data persistence processors 206-1 to 206-5, which may manage transactions involved in the commit phase of the processing. As this is a distributed system, each task or group of tasks may have their own data persistency processor and there is no coordination between the data persistence processors or with other tasks. Data persistence processor 206 may manage transactions to cause the communicated data parts to be persisted to object store 204. For example, as shown in the example of FIG. 2, a data part from task 2 208-2, "temporary/0/temporary/attempt 201610038 0001 m 000002 00/part-00-02," may be attempted to be persisted to object store 204 as "data.txt/part-0002-ID-201610038 0001 m 000002 00." Likewise, a data part from task 4 208-4 "temporary/0/temporary/attempt 201610038 0001 m 000004 00/part-0004" may be attempted to be persisted to object store 204 as "data.txt/part-0004-ID-201610038 0001 m 000004 00."

In operation, there may be failed tasks, replacement tasks, and the like, however, each task execution may have its own unique ID. Accordingly, such failed tasks, replacement tasks, etc., may be distinguished. In the example shown in FIG. 2, task 3 208-3 has two attempts to persist data. Each attempt has its own unique ID. In this example, the first attempt may be identified as "_temporary/0/_temporary/attempt_201610038_0001_m_000003_00/part-0003." As the first attempt is unsuccessful, a second attempt may be made, which may be identified as "_temporary/0/_temporary/attempt_201610038_0001_m_000003_01/part-0003." Such naming may provide the capability to distinguish the two attempts. As shown in this example, the first attempt involving the data part from task 3 208-3, "_temporary/0/_temporary/attempt_201610038_0001_m_000003_00/part-0003" may be attempted to be persisted to object store 204 as "data.txt/part-0003-ID-201610038_0001_m_000003_00." The second attempt involving the data part from task 3 208-3, "_temporary/0/_temporary/attempt_201610038_0001_m_000003_01/part-0003" may be attempted to be persisted to object store 204 as "data.txt/part-0003-ID-201610038_0001_m_000003_01."

Once all the parts $\{d\_i\}$ have been successfully persisted in the object store 204 with identifications conforming to $d\_i\_\{task\_i\_id\}$, process 300 may continue with a completion phase.

It is to be noted that that process 300 is distributed across the executors 110A-N, shown in FIG. 1, and master/driver/etc. component 212. Master/driver/etc. component 212 distributes work to the executors. Each executor 110A-N may run a certain number of tasks in parallel. Master/driver/etc. component 212 assigns tasks to an executor up to the number it may run in parallel. When a task completes, the driver/master 212 may assign a new task to the executor 110A-N where the completed task ran. This continues until all of the tasks have been run successfully. So, the master/driver/etc. component 212 may keep track of which tasks succeed as it orchestrates the running of the tasks across the executors 110A-N.

At 304, as tasks complete a list of successful task executions 214 may be built by the driver as it orchestrates the executions of the tasks. Referring briefly to FIG. 1, driver, master, etc. 102 may distribute work to executors 110A-N. Each executors 110A-N may run a certain number of tasks in parallel. Driver, master, etc. 102 may assign tasks to an executor up to the number it can run in parallel. When a task completes, driver, master, etc. 102 may assign a new task to the executor that the completed task. This may continue until all of the tasks have been run successfully. So, driver, master, etc. 102 may keep track of which tasks succeed as it orchestrates the running of the tasks across the executors 110A-N. Accordingly, in 304, the list of successful task executions may be built by the driver, master, etc. 102 as it orchestrates the executions of the tasks.

Typically, such information may be maintained by one of the components in analytic framework 202, such as master/driver/etc. component 212. At 306, master/driver/etc. component 212 may write a _SUCCESS object 214 to the same location (in this example, object store 204) that contains all the parts $d\_i\_\{task\_i\_id\}$. The content of the _SUCCESS object 214 may include the list of successfully completed tasks including their unique IDs and names of the persisted objects that was obtained from master, driver, etc., component 212. This list of successfully completed tasks may be termed a "manifest".

Also shown in FIG. 3 is a process 320 of reading back a data set persisted using process 300. Process 320 may best be viewed in conjunction with FIG. 4. In this example, a read task 402 reads the data file "data.txt", which may be made up of data parts on object store 204. Process 320 begins with 322, in which the _SUCCESS object 404 including the list 406 of successfully completed tasks may be read back from the location (in this example, object store 204) that contains all the parts d_i_{task_i_id}. Then, at 324, using the list 406 of successfully completed tasks, the properly persisted data parts may be read 408. In this example, use of the list 406 of successfully completed tasks avoids incorrect results, which may otherwise occur due to the failure of the first attempt involving the data part from task 3 208-3, described above.

Figure 5:
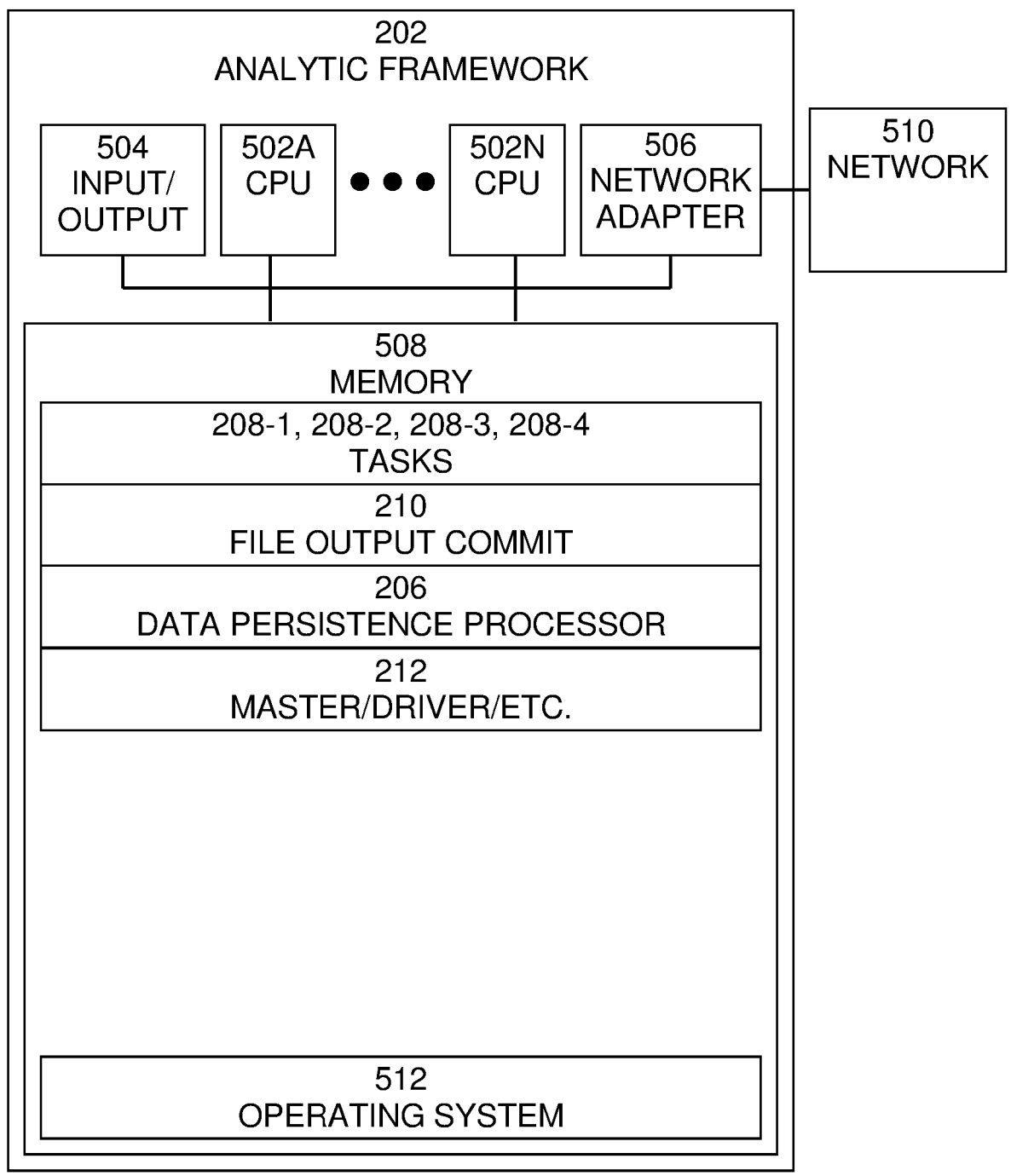
FIG. 5 is an exemplary block diagram of an analytic framework in which processes involved in the embodiments described herein may be implemented.

An exemplary block diagram of an analytic framework 202, in which processes involved in the embodiments described herein may be implemented, is shown in FIG. 5. Typically analytic framework 202 is implemented as a distributed system made up of multiple servers, where each server has its own CPU, memory, network, and operating system. Each server may include one or more worker nodes running one or more executors, with each executor having its own output committer and running several tasks. Analytic framework 202 may be implemented using one or more programmed general-purpose computer systems, such as embedded processors, systems on a chip, personal computers, workstations, server systems, and minicomputers or mainframe computers, or in distributed, networked computing environments. Analytic framework 202 may include one or more processors (CPUs) 502A-502N, input/output circuitry 504, network adapter 506, and memory 508. CPUs 502A-502N execute program instructions in order to carry out the functions of the present communications systems and methods. Typically, CPUs 502A-502N are one or more microprocessors, such as an INTEL CORE® processor. FIG. 5 illustrates an embodiment in which analytic framework 202 is implemented as a single multi-processor computer system, in which multiple processors 502A-502N share system resources, such as memory 508, input/output circuitry 504, and network adapter 506. However, the present communications systems and methods also include embodiments in which analytic framework 202 is implemented as a plurality of networked computer systems, which may be single-processor computer systems, multi-processor computer systems, or a mix thereof.

Input/output circuitry 504 provides the capability to input data to, or output data from, analytic framework 202. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of analytic framework 202. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that analytic framework 202 is programmed to perform. In the example shown in FIG. 5, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 5, memory 508 may include tasks 208-1, 208-2, 208-3, 208-4, file output commit block 210, data persistence processor 206, master/driver/etc. 212, and operating system 512. Tasks 208-1, 208-2, 208-3, and 208-4 may perform processing in analytic framework 202 and may generate data to be stored. File output commit block 210 may handle data storage transactions in analytic framework 202 and may generate specific data parts, such as files or parts of files, and may generate identifications of those data parts, such as file names for the files. Data persistence processor 206 may manage the commit phase of the processing. Master/driver/etc. 212 may maintain a list of all successfully completed task executions and their unique IDs. Operating system 520 may provide overall system functionality.

As shown in FIG. 5, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for data distribution comprising:
   generating a plurality of data parts from a plurality of distributed processing tasks, each processing task independent of each other processing task;
   as each data part is generated, attempting to persist each data part independently of each other data part, wherein a file name of each data part includes a unique identifier of the data part and the file name also comprises a combination of a unique identifier of the attempt to persist the data part, a number of previous attempts to persist the data part, a year of the attempt to persist the data part, and an identifier as to whether the data part is associated with a replacement task;
generating a manifest including information indicating those attempts to persist data parts that have succeeded; and
persisting the manifest with the data parts that have been successfully persisted.

2. The method of claim 1, further comprising:
if an attempt to persist a data part by a processing task fails, attempting again to persist that data part using the same or a different processing task.

3. The method of claim 2, wherein:
the manifest includes, for each data part that has been successfully persisted, a unique identifier of the data part and of the attempt to persist the data part.

4. The method of claim 1, further comprising:
reading the manifest to obtain the unique identifier of each data part and of the attempt to persist the data part that has been successfully persisted; and
based on the unique identifier, reading the data parts that have been successfully persisted.

5. The method of claim 1, further comprising:
reading the manifest to obtain information identifying the data parts that have been successfully persisted; and
based on the information identifying the data parts that have been successfully persisted, reading the data parts that have been successfully persisted.

6. The method of claim 1, wherein the manifest is persisted to a same object store location as the data parts.

7. The method of claim 1, wherein the unique identifier of the attempt to persist the data part further comprises information of a task execution related to the attempt to persist the data part.

8. A system for data traffic distribution, the system comprising a processor, memory accessible by the processor, and computer program instructions stored in the memory and executable by the processor to perform:
generating a plurality of data parts from a plurality of distributed processing tasks, each processing task independent of each other processing task;
as each data part is generated, attempting to persist each data part independently of each other data part, wherein a file name of each data part includes a unique identifier of the data part and the file name also comprises a combination of a unique identifier of the attempt to persist the data part, a number of previous attempts to persist the data part, a year of the attempt to persist the data part, and an identifier as to whether the data part is associated with a replacement task;
generating a manifest including information indicating those attempts to persist data parts that have succeeded; and
persisting the manifest with the data parts that have been successfully persisted.

9. The system of claim 8, further comprising:
if an attempt to persist a data part by a processing task fails, attempting again to persist that data part using the same or a different processing task.

10. The system of claim 9, wherein:
the manifest includes, for each data part that has been successfully persisted, a unique identifier of the data part and of the attempt to persist the data part.

11. The system of claim 8, further comprising:
reading the manifest to obtain the unique identifier of each data part and of the attempt to persist the data part that has been successfully persisted; and
based on the unique identifier, reading the data parts that have been successfully persisted.

12. The system of claim 8, further comprising:
reading the manifest to obtain information identifying the data parts that have been successfully persisted; and
based on the information identifying the data parts that have been successfully persisted, reading the data parts that have been successfully persisted.

13. The system of claim 8, wherein the manifest is persisted to a same object store location as the data parts.

14. The system of claim 8, wherein the unique identifier of the attempt to persist the data part further comprises information of a task execution related to the attempt to persist the data part.

15. A computer program product for data traffic distribution, the computer program product comprising a non-transitory computer readable storage having program instructions embodied therewith, the program instructions executable by a computer, to cause the computer to perform a method comprising:
generating a plurality of data parts from a plurality of distributed processing tasks, each processing task independent of each other processing task;
as each data part is generated, attempting to persist each data part independently of each other data part, wherein a file name of each data part includes a unique identifier of the data part and the file name also comprises a combination of a unique identifier of the attempt to persist the data part, a number of previous attempts to persist the data part, a year of the attempt to persist the data part and an identifier as to whether the data part is associated with a replacement task;
generating a manifest including information indicating those attempts to persist data parts that have succeeded; and
persisting the manifest with the data parts that have been successfully persisted.

16. The computer program product of claim 15, wherein:
the manifest includes, for each data part that has been successfully persisted, a unique identifier of the data part and of the attempt to persist the data part.

17. The computer program product of claim 16, further comprising:
reading the manifest to obtain the unique identifier of each data part and of the attempt to persist the data part that has been successfully persisted; and
based on the unique identifier, reading the data parts that have been successfully persisted.

18. The computer program product of claim 15, further comprising:
reading the manifest to obtain information identifying the data parts that have been successfully persisted; and
based on the information identifying the data parts that have been successfully persisted, reading the data parts that have been successfully persisted.

19. The computer program product of claim 15, wherein the manifest is persisted to a same object store location as the data parts.

20. The computer program product of claim 15, wherein the unique identifier of the attempt to persist the data part further comprises information of a task execution related to the attempt to persist the data part.

* * * * *